United States Patent [19]
Zwanenburg et al.

[11] 4,364,986
[45] Dec. 21, 1982

[54] DYE-CONTAINING LAYER OF A FILM-FORMING POLYMERIC BINDER AND THE USE THEREOF IN AN INFORMATION RECORDING ELEMENT

[75] Inventors: Dirk J. Zwanenburg; Wilhelmus P. M. Nijssen; Caspert G. I. van der Staak, all of Eindhoven, Netherlands

[73] Assignee: U.S. Philips Corporation, New York, N.Y.

[21] Appl. No.: 194,507

[22] Filed: Oct. 6, 1980

Related U.S. Application Data

[63] Continuation-in-part of Ser. No. 172,787, Jul. 28, 1980, abandoned.

[30] Foreign Application Priority Data

Aug. 1, 1979 [NL] Netherlands .................. 7905914

[51] Int. Cl.³ .................. B32B 3/00; G01D 15/34
[52] U.S. Cl. .................. 428/156; 346/135.1; 346/137; 430/945; 428/204; 428/207; 428/520; 428/913
[58] Field of Search .............. 430/945; 428/156, 195, 428/204, 207, 913, 520; 346/135.1, 137; 235/488

[56] References Cited

U.S. PATENT DOCUMENTS 4,230,939 10/1980 de Bont et al. .................. 430/945 X
4,248,959 2/1981 Jeffers et al. .................. 430/945 X
4,259,433 3/1981 Mizobuchi et al. .............. 430/945 X

FOREIGN PATENT DOCUMENTS 2514678 7/1977 Fed. Rep. of Germany .
7702971 9/1977 Netherlands .

OTHER PUBLICATIONS

Technical Bulletin 7583-011 Rev. 1, "Gantrez An poly-(methylvinylether/maleic anhydride)", publ. 1968, GAF Corp. U.S.A.
Technical Bulletin 2550-007, published by GAF, "Gantrez AN", pp. 1–41.

Primary Examiner—Thomas J. Herbert, Jr.
Attorney, Agent, or Firm—Norman N. Spain

[57] ABSTRACT

Dye-containing layer of a film-forming polymeric binder and the application thereof in an information recording element.

The invention relates to a dye-containing layer in which dye, if desired in a very large weight percentage is dissolved or finely divided in a copolymer (1:1) of methyl vinyl ether and maleic anhydride or a semi-ester thereof.

The dye-containing layer is particularly suitable for use as a recording layer in an optical information recording element.

6 Claims, 4 Drawing Figures

DYE-CONTAINING LAYER OF A FILM-FORMING POLYMERIC BINDER AND THE USE THEREOF IN AN INFORMATION RECORDING ELEMENT

This application is a continuation in part of application Ser. No. 172,787 filed July 28, 1980 and now abandoned.

BACKGROUND OF THE INVENTION

The invention relates to a dye-containing layer of a film-forming polymeric binder, in which the dye is dissolved or finely divided in the binder matrix.

In technology, in particular in the field of optical filters and optical information recording elements, there exists a strong need for very thin dye-containing layers which can be easily provided on a substrate and which have a high optical density with a small thickness.

Layers are known which consist entirely of dye and which can be provided on a substrate by means of a vapor deposition process in a small layer thickness of, for example, 0.5 um and with an optical density of approximately 0.4. Due to the vapor deposition process, the choice of the dye is restricted. For example, dyes having a low vapor pressure, for example ionic dyes, cannot be used. The same applies to dyes which are thermally unstable.

There are also known dye-polymer layers in which the dye is dissolved or finely divided in a polymeric binder. The layers can be obtained in various manners.

According to a conventional method, the dye is dissolved in liquid monomers. The solution is provided on the substrate to be coated in a thin layer and the monomers are then polymerized. For example, liquid monomers, for example acrylic acid esters, which can be polymerized with light, for example ultraviolet light, may be used. The resulting layers contain a comparatively small quantity of dye because only a small amount of dye, for example at most 5% by weight, can be dissolved in the liquid monomers. The result of the small concentration of dye is that comparatively thick layers in a thickness which is significantly more than 1 um are required to obtain an acceptable optical density, of for example, 0.4 and more.

Furthermore there are known dye-containing layers of a film-forming polymeric binder in which the dye is dissolved or finely divided in the binder matrix. These layers are manufactured by dissolving both the polymeric binder and the dye in a suitable solvent or mixture of solvents, then coating a substrate with a thin layer of the solution and finally evaporating the solvent in air or in a vacuum. By variation of the solvent, a large variety of dyes may be used. The quality of the layer or film is much less dependent on the concentration of the dye than in the above-described layers obtained by using liquid monomers.

However, it has not been possible to manufacture dye-containing layers of a film-forming polymeric binder in which a large quantity of dye is dissolved. The known layers must therefore be used in comparatively large thicknesses of more than 1 um so as to be able to realize a sufficiently high optical density of the layer.

The layer thicknesses mentioned in literature vary from a minimum value of 1-2 um (Science 154, pp. 1550-1966); W. C. Meyers, Proc., 3rd Int. Cong. Reprography London, Conf. paper 39 (1971); *J. appl. Photo. Eng.*, 3, p. 40 (1977), to a value of 15-50 um German Off. 19 21 245; c.a. 82, 37 59t (1975); C.A. 82, 49 883x (1975); *J. Appl. Chem. Biotechnol.* 22, p. 799 (1972).

SUMMARY OF THE INVENTION

One of the objects of the invention is to provide a dye-containing layer of the kind mentioned in the opening paragraph in which a very large quantity of dye is dissolved. Another object of the invention is to provide layers which have a good film quality, are bright, that is to say not cloudy or milky and readily adhere to different substrates, in particular synthetic resins and glass. A further object of the invention is to realize a dye-containing layer which in a very small thickness which is smaller than 1 um has a large optical density and is particularly suitable for use in optical information recording elements.

According to the invention, these objects are achieved with a dye-containing layer of the type mentioned in the opening paragraph and which is characterized in that the binder is a copolymer (1:1) of methyl vinyl ether and maleic acid anhydride or a semi-ester of the copolymer and a monohydroxy alcohol having a melting point below room temperature.

This copolymer as well as the semi-esters thereof are known products. The copolymer is commercially available under the registered trademark Gantrez AN. The commercial product sold under the trademark Gantrez AN is described in the Technical Bulletin 7583-011 Rev. 1 entitled "Gantrez AN poly(methyl vinyl ether/maleic anhydride)", published in 1968 by GAF, pages 1-6, 20 and 21 of which are hereby incorporated by reference. Four different grades of Gantrez AN copolymers each having a different degree of polymerization are obtainable as Gantrez AN-119 a low molecular polymer having a specific viscosity of 0.1-05; Gantrez AN-139 a medium molecular polymer having a specific viscosity of 0.1-1.4; Grantrez 149 a medium molecular polymer having a specific viscosity of 1.5-2.0 and Gantrez AN 169 a high molecular polymer having a specific viscosity of 2.6-3.5. The viscosity is measured in a solution of 1 g of the copolymer in 100 ml of methyl ethyl ketone at 25° C.

The semi-ester of the copolymer is obtained by dissolving the copolymer in an excess of the alcohol and then heating the solution under reflux for a few hours.

The dye-containing layer according to the invention is manufactured by dissolving the binder and the dye in a suitable solvent, providing the resulting solution in a thin layer on a substrate, for example, a synthetic resin or glass plate, and finally evaporating the solvent.

Suitable solvents are in particular the polar solvents, such as alcohols, ketones, ethers and esters. The solvent preferably has a boiling point or boiling range between approximately 50° and 250° C. Solvents having a lower boiling point evaporate rather rapidly, which reduces the quality of the layer to be formed. Solvents having a higher boiling point have the disadvantage that the required evaporation is very time consuming. Particularly useful solvents are the saturated monohydroxy aliphatic alcohols of 1 to 10 carbon atoms such as methanol, ethanol, butane, 1-pentanol, 3-pentanol, 1-hexanal, and 1-decanol and mixtures thereof and notably mixtures of aliphatic alcohols having a comparatively low and comparatively high boiling point, for example in particular a mixture of methanol and butanol in a volume ratio which preferably lies between 1:5 and 1:1. Alcohols in particular give a good wetting of the most interesting substrate materials, for example, glass, synthetic resin, in particular polymethyl methacrylate (PMMA), and metals, for example, Cr-Ni steel, in which the resulting layer shows a good adhesion to the substrate. If desired, an auxiliary solvent, for example a ketone, ester or ether, may be added to the alcoholic solvents. By the addition of these auxiliary solvents the solubility of some dyes in the binder solution can be increased.

It should be borne in mind that upon using an alcohol as a solvent the free copolymer of methyl vinyl ether and maleic anhydride is at least partly converted into the semi-ester.

This is done not only with the above-mentioned aliphatic alcohols but also with the likewise useful aromatic alcohols, such as phenol, aromatic-aliphatic alcohols, for example benzyl alcohol, and ethyl-cellosolve (ethylene glycol monoethyl ether). If no semi-ester is desired, a neutral solvent should be used. Very suitable in this case are the ketones such as ethyl methyl ketone or, for example, cyclohexanone.

The solution of dye and binder in the selected solvent may be provided by various methods on the substrate which is to be covered with the layer according to the invention. For example, the substrate may be treated with the solution by means of a spraying process. It is also possible to immerse the substrate in the solution and then remove the coated substrate from the solution.

A very suitable process is, in particular, the centrifugal process. According to this process, the substrate to be covered is laid on a turntable and a quantity of solution is then provided on the substrate. By rotating the substrate, the liquid will spread circularly over the surface of the substrate. Applicants have found in experiments that very thin layers can be obtained by means of the centrifuging process the thickness of which depends inter alia on the rotation speed of the substrate and the viscosity of the solution to be spread. It has been found that layers having a thickness smaller than 1 um are obtained if the viscosity of the solution lies in the order of magnitude of a few cP, for example up to 10 cP, and a speed of rotation is used of approximately 500–2500 rpm. The percentage of solid substance in the solution must also be preferably rather low and generally be at most 5–10% by weight.

In a favorable embodiment of the dye-containing layer according to the invention the binder is a semi-ester of the copolymer and an aliphatic alcohol which may be substituted with an aromatic radical and contains 1-8 carbon atoms. The layers have an excellent quality. This applies in particular to layers in which the binder is a semi-ester of the copolymer and butanol.

In a further favorable embodiment the layer in accordance with the invention comprises an ionic dye in a quantity of at most 94% by weight. Particularly the ionic dyes can be dissolved in the binder in a very high weight concentration in which, as will become apparent from the examples recorded at the end of the specification, a weight percentage of dye of 94% can be reached. For example, layers have been manufactured with ionic dyes which in a thickness of approximately 0.1–0.3 um show an optical density exceeding 1, that is to say a light absorption exceeding 90%. If a less high optical density will suffice or otherwise thicker layers can be tolerated, a lower dye concentration in the binder may be chosen.

Examples of ionic dyes are Rhodamines, for example Rhodamine B, Rhodamine 6G and Rhodamine 110; triphenylmethane dyes, for example malachite green; pyryllium dyes, for example, 8-(6,7-dihydro-2, 4-diphenyl-5H-1-benzopyran-8-yl) methylene-5,6,7,8,tetrahydro-2,4-diphenyl-benzopryllium chloride; thriopyrylium dyes, for example, 8- 6,7-dihydro-2,4-diphenyl-5H-1-benzothiopyran-8-yl) methylene-5,6,7,8-tetrahydro-2,4-diphenyl-1-benzo thiopyryliumuchloride and 4,6-diphenyl-2-3-(4,6-diphenyl-2H-thiopyran-2-ylidene)propenyl thiopyrylium chloride; Rentamethine dyes, for example, 1,5-bisphenyl-1,5-bis (p-dimethylamino phenyl)-2,4-pentadienylium-chloride and 1,1,5,5-tetrakis (p-dimethylamino phenyl)-2,4-pentadienylium chloride.

The dye-containing layer may be used in, for example, optical filters and advantageously in optical information recording elements.

The invention also relates to an information recording element in which information can be written and read optically and which comprises a disk-shaped substrate having a dye-containing recording layer.

Such a recording element is disclosed in Netherlands Patent Application No. 77 02 971, published on Sept. 21, 1977. In this known recording element the disk-shaped substrate is provided on one side with a thin layer of a strongly reflective material, for example, a vapor-deposited aluminum layer, which in turn is provided with a recording layer consisting of a vapor-deposited dye. On the side of the recording layer the element is exposed from the air to laser light which is pulsated in accordance with the information to be recorded. In the exposed spots of the recording layer the dye evaporates and holes are formed. The recorded information is read in reflection with weaker laser light.

The disadvantage of the known recording element is that the evaporated dye is easily redeposited, for example, on other parts of the recording layer. A further disadvantage is that numerous dyes, in particular the ionic dyes which cannot be vapor-deposited or with difficult only, cannot be used. Furthermore a vapor deposition process has the disadvantage that quite a few precautions have to be taken to assure that only the article to be covered is provided is actually provided with a vapor-deposited layer of dye.

The recording element according to the invention is almost entirely free of these disadvantages and is characterized in that a dye-containing recording layer is used in which the dye is dissolved in a binder which is formed by a copolymer (1:1) of methyl vinyl ether and maleic anhydride or a semi-ester thereof.

Thus in the recording element according to the invention a dye-containing layer is used as previously described.

Upon exposing the recording element according to the invention to pulsated laser light, permanent chemical or physical changes are introduced into the recording layer which can be read by means of a laser light which is considerably weaker than the recording laser light.

The exposure to laser light modulated according to the information to be recorded may be done both from the air side and from the substrate side. In the latter case the substrate should be transparent to the laser light used and consists, for example, of glass or be formed of transparent synthetic resin, in particular polymethyl methacrylate. Reading of the recorded information may also be done either from the air (air-incident) or from the transparent substrate. Recording and reading from the substrate have the advantage that the scratches, dust particles and the like present on the element fall beyond the depth of focus of the objective which focuses the laser light on the recording layer. Thus, these contaminations have no detrimental influence on the quality of the recorded or read information.

In the recording layer of the element according to the invention, holes or pits are formed in the exposed places in which surprisingly the recording material originating from the holes or pits form a ridge around the pits or holes. Remarkably, the shape of the holes or pits having a ridge portion greatly resembles those which are obtained on using an information recording device in which a metal layer is used, for example, a Bi- or Te layer, as a recording layer.

In the latter case which is known, for example, from German Auslegeschrift No. 2,514,678, discrete liquid areas are formed upon exposing the metallic recording layer. Under the influence of surface phenomena, the liquid in the areas retracts in the form of a ridge while forming an opening which has an upright edge along its circumference.

In the recording layer of the element according to the invention, the above-mentioned holes or pits which have small diametrical dimensions in the order of magnitude of 1 um can be formed while using a small quantity of laser light energy. For example, lasers may be used for recording which have a power smaller than 10 mW, for example 7 mW, with a pulse time of $10^{-6}$ to $10^{-8}$ sec., for example $5.10^{-7}$ sec.

The high optical density and the small thickness of the recording layer provide an important contribution in providing the advantage that only a small quantity of laser light energy is required to record the information.

The recording layer in the element according to the invention exhibits a sufficient reflecting power relative to laser light to be able to read the recorded information in reflection by means of laser light. When reading in reflection, fewer optical elements, for example objectives, are needed because the forward and reflected reading beams follow the same optical path to a considerable extent. For good order's sake it is to be noted that reading may, of course, also be carried out in transmission.

The dye-containing recording layer of the element according to the invention furthermore shows the phenomenon of a change in the absorption spectrum of the dye. It has been found that after processing the dye in the recording layer the absorption maxima of the dye are widened, that is to say, they extend over a large wavelength range. This implies that when the element according to the invention is used, lasers may be used having a wider emission spectrum.

In an interesting embodiment of the recording element according to the invention the recording layer on its surface remote from the substrate has a transparent coating layer which is not attacked by the laser light used for recording. A suitable coating layer is a transparent lacquer layer, in particular a lacquer layer formed of polymeric acrylates or methacrylates. The use of a polyalkylacrylate or polyalkylmethacrylate is particularly suitable. As an example thereof there may be mentioned polyisobutylmethacrylate.

In this particular embodiment, upon exposing the element to pulsated laser light, no holes are formed but decolorization takes place of the dye present in the recording layer in the exposed places. The decolorized spots have a small diameter of approximately 1 um and due to the difference in optical density relative to the background, they can be read by means of laser light. The reading laser light may be focused on the recording layer either from the air or via the substrate. The recorded information may furthermore be read either in transmission or preferably in reflection. The quantity of laser light energy required for decolorizing is small. Good results are obtained when using a laser having a power of at most 10 mW on the recording layer and a pulse time of $10^{-6}$ to $10^{-8}$ sec.

The substrate used in the element according to the invention may be provided, on the side of the recording layer, with a strongly reflective metal layer, for example a vapor-deposited Al layer, on which the dye-containing recording layer is provided. For recording information the reflective metal coated element should be exposed from the air side, and not through the substrate, the above-mentioned holes or decolorized spots being formed in the recording layer. The recorded information must be read from the air and in reflection by means of laser light.

In a favorable embodiment of the element according to the invention the dye-containing recording layer is provided on a transparent substrate and is coated with a reflection ablative recording layer.

An ablative recording layer is a layer which melts under the influence of laser light and form holes in the exposed placed. Examples of reflective ablative recording layers are layers of metal, metal alloy or a chalogenide glass. Particularly suitable are the chalgogenide glasses which contain tellurium and/or selenium, and furthermore one or more elements selected from the group consisting of As, Sb, Bi, Sn, Sn, Ga, Ge, Tl and Ind. The reflective ablative recording layer has a small thickness of, for example, 50 nm and may be provided by means of a vapor deposition process.

Upon recording information in this favorable embodiment of the element according to the invention, the element is exposed to pulsated laser light via the substrate which is transparent. The laser light beam passes through the substrate and dye-containing layer in which, dependent on the composition of said layer, a part of the laser light is absorbed. The remaining laser light is partly absorbed by the ablative recording layer and partly reflected. The reflected beam again passes through the dye-containing layer, where absorption takes place again, and finally leaves the element on the side of the substrate. As a result of the absorption of energy in the dye-containing layer and the ablative recording layer, the temperature of said layers will rise, in which finally a hole is formed in the exposed places in the dye-containing layer and in the ablative recording layer.

In the absence of the dye-containing layer, a large amount of laser light energy is required to form the holes in the ablative recording layer. When the dye-containing layer according to the invention is used, a gain in energy of at least 20% is reached.

The recorded information may be read either from the air or via the supporting plate by means of laser light. Reading may furthermore be carried out either in transmission or in reflection.

In a further favorable embodiment of the element according to the invention a transparent substrate is used which on the side of the recording layer has an optically readable servo track which has at least partly a relief structure of servo areas situated alternately at a higher and a lower level.

The servo track is usually spiral or constructed from concentric circles, the servo areas situated alternately at a higher and a lower level giving the track a crenellated profile. The longitudinal dimensions of the servo areas which have the form of blocks and pits, vary in agreement with the stored servo data and are roughly from 0.3 and 3 um. The difference in height between blocks and pits is a quarter of a wavelength of the laser light with which the servo track and the servo data are read optically in phase.

The element according to the invention comprising a servo track has the significant advantage that the recording of information in the recording layer is accurately controlled by the servo data present in the servo track and which, for example, comprise orders as regards the speed of the information recording and the place of recording. The laser light beam which scans the servo track via the transparent substrate, hereinafter termed servo laser light, transmits the servo data to a control mechanism for a laser light beam of a significantly higher energy content with which the desired information can be recorded in the recording layer.

The recording of information preferably takes place in those parts of the recording layer which are situated on the servo track between the servo data.

The servo track may be provided in the surface of the substrate plate but may also be present in a layer provided on the surface of the substrate and consisting, for example, of a synthetic resin, for example, a light-cured lacquer layer. A substrate which has a lacquer layer which comprises the servo track may be manufactured, for example, by means of a matrix. For this purpose, a liquid, light-curable lacquer is provided on a matrix surface which has the servo track, the transparent substrate plate is then laid herein and the assembly is light-cured via the substrate plate, after which the substrate plate with the cured lacquer layer connected thereto and in which the servo track is copied is taken from the matrix surface. A substrate plate provided with a servo track can be manufactured by means of a jig by means of a molding, injection molding or compression molding process.

The reading element according to the invention may furthermore be manufactured in a double construction. In this case the element comprises an assembly of two transparent substrate plates each comprising a dye-containing recording layer as defined above, the recording layers facing each other and being connected together with the inter-position of an annular spacer. Recording and reading of information is carried out by exposing the recording layers via the respective substrate plates. The element is furthermore read in reflection.

DESCRIPTION OF THE PREFERRED EMBODIMENTS

Example 1

Figure 1:
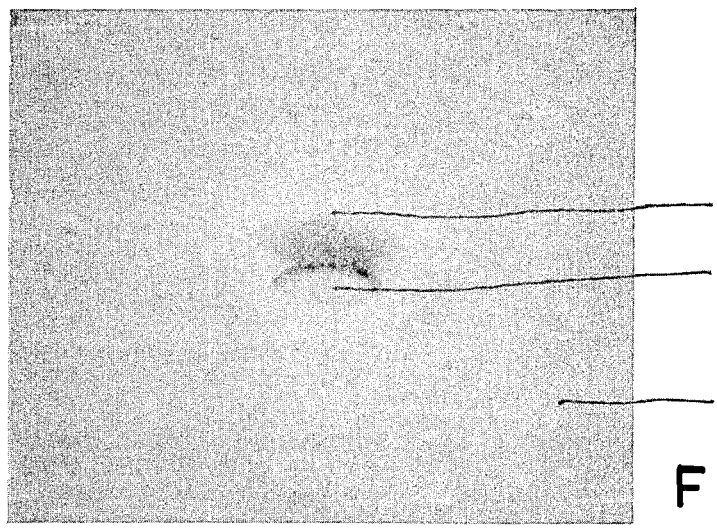
FIG. 1 is a photographic view (enlarged 20,000 times) of a part of the surface of a recording element according to the invention in which a hole has been formed by means of laser light.

Preparation of dye-containing layers.

20 g of a copolymer (1:1) of methyl vinyl ether and maleic anhydride (Gantrez AN 149) were added to 500 ml of butanol-1. The whole was refluxed for 8 hours, a bright standard polymer solution containing 4% by weight of the semi-ester of methyl vinyl ether-maleic anhydride and butanol-1 being obtained.

By further addition of butanol-1 and methanol or by adding ethylene glycol monoethyl ether (cellosolve), polymeric solutions with different binder weight percentages were obtained. The composition of these solutions is indicated in the table below (columns 1, 2).

In the binder solutions various dyes were dissolved in different quantities in which the binder solution may be slightly heated. After cooling, the dye-binder solution was filtered and 1 ml of the solution was poured on the surface of a substrate plate of polymethylmethacrylate having dimensions of 6.25 cm×6.25 cm. The substrate plate was laid on the turntable of a centrifuge. The centrifuge was then started, the adjusted centrifuge speed being reached in a few seconds. The substrate is rotated for 3 minutes after which the dye-binder layer is dried in air. Finally the optical density of the dye-binder layer is measured in transmission. The various process parameters, for example quantity of provided dye-binder solution, type of dye, quantity of dye, speed of the centrifuge as well as the thickness of the resulting dye-binder film and the optical density of the film are recorded in the following TABLE 1.

The abbreviations used in the Table to denote the type of dye have the following meanings.

Rh-6G and Rh-6G pic denote rhodamine 6G and rhodamine 6G-picrate, respectively. The dyes correspond to the formula

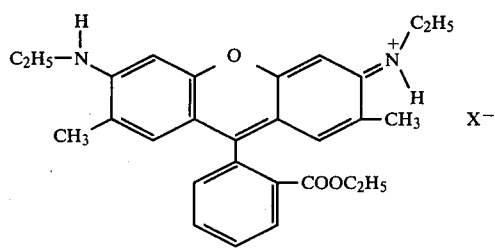

wherein X is Cl (Rh 6G) or

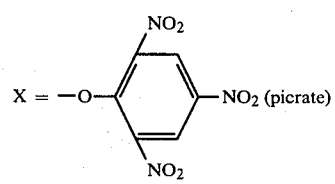

TABLE 1

| Wt. % binder | Solvents | Vol. Ratio solvent | Quant. in ml. | Type | Quant. in mg. | Speed centrifuge rpm | film thickness in um. | optical density | Wavelength in nm |
|---|---|---|---|---|---|---|---|---|---|
| 2 | butanol-methanol | 4:1 | 50 | Rh-6G | 74 | 500 | 0.7 | 0.62 | 535 |
| 1 | " | 7:3 | 50 | " | 122 | 500 | 0.22 | 0.65 | 535 |
| 0.8 | " | 2:1 | 50 | " | 192 | 1000 | 0.13 | 0.57 | 540 |
| 0.8 | " | 2:1 | 25 | " | 227 | 1000 | 0.13 | 1.18 | 545 |
| 2 | " | 4:1 | 25 | Rh 110 Z | 42 | 500 | 0.7 | 0.66 | 510 |
| 1 | " | 7:3 | 25 | " | 55 | 500 | 0.22 | 0 50 | 512 |
| 2 | " | 4:1 | 30 | Rh 110 E | 57 | 500 | 0.7 | 0.75 | 505 |
| 1 | " | 7:3 | 17 | " | 50 | 500 | 0.22 | 0.77 | 505 |
| 0.8 | " | 2:1 | 20 | " | 20 | 1000 | 0.13 | 0.70 | 518 |
| 2 | " | 4:1 | 45 | Rh-B | 60 | 500 | 0.7 | 0.66 | 540 |
| 1 | " | 7:3 | 67 | " | 67 | 500 | 0.7 | 0.50 | 565 |
| 0.5 | " | 2:1 | 37 | Rh-6G | 133 | 1000 | 0.07 | 0.48 | 545 |
| 0.4 | " | 2:1 | 50 | " | 199 | 1000 | 0.06 | 0.49 | 548 |
| 0.3 | " | 2:1 | 65 | " | 311 | 1100 | 0.06 | 0.46 | 550 |
| 2 | " | 4:1 | 25 | K1 | 20 | 500 | 0.22 | 0.36 | 835 |
| 1 | " | 7:3 | 25 | K2 | 79 | 500 | 0.22 | 0.44 | 650 |
| 0.8 | " | 2:1 | 25 | K2 | 124 | 1000 | 0.13 | 0.43 | 650 |
| 0.8 | " | 2:1 | 1 | K3 | 8 | 1000 | 0.13 | 0.55 | 860 |
| 0.8 | " | 2:1 | 1 | K3 | 17 | 1000 | 0.13 | 0.74 | 860 |
| 0.8 | " | 2:1 | 1 | K3 | 24 | 1000 | 0.13 | 1.45 | 860 |
| 0.8 | butanol-cellosolve | 1:4 | 10 | Rh-6G pic | 200 | 1000 | 0.13 | 1.45 | 545 |
| 0.8 | " | 1:4 | 10 | " | 200 | 2000 | 0.09 | 1.05 | 545 |
| 0.8 | " | 1:4 | 1 | K4 | 24 | 1000 | 0.13 | 1.37 | 820 |
| 0.4 | " | 1:4 | 1 | K4 | 24 | 1000 | 0.09 | 0.9 | 820 |
| 0.8 | " | 1:4 | 1 | K5 | 24 | 1000 | 0.13 | 0.95 | 750 |
| 0.4 | " | 1:4 | 1 | K5 | 24 | 1000 | 0.09 | 0.7 | 750 |
| 0.8 | " | 1:4 | 1 | K6 | 24 | 1000 | 0.13 | 0.9 | 580 |

Rh-B, Rh 110Z and Rh 110E denote rhodamine B, rhodamine 110 acid and rhodamine 110 ester which corresponds to the following formulae:

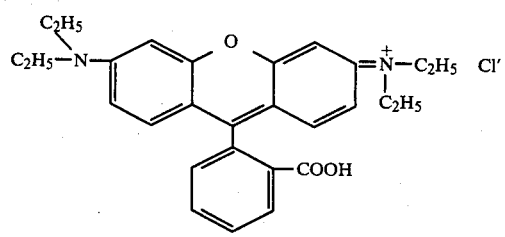

(Rhodamine B)

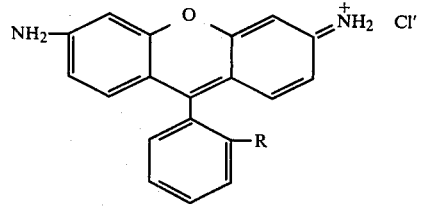

in which
R=—COOH (rhodamine 110 acid) or
R=CooC$_2$H$_5$ (rhodamine 110 ester).

The dyes K$_1$-K$_6$ are respectively:

K$_1$ = 1,5 bisphenyl-1,5-bis(p-dimethylaminophenyl)-2,4-pentadienylium chloride K$_2$ = 1,1,5,5-tetrakis (p-dimethylaminophenyl)-2,4-pentadienylium chloride K$_3$ = 8-[6,7-dihydro-2,4-diphenyl-5H-lbenzopyran-8-yl]-2,4 methylene]-5,6,7,8-tetrahydro-2,4-diphenyl-1-benzopyrylium chloride K$_4$ = 8-[6,7-diphdro-2,4-diphenyl-5H-1-benzothiopyran-8-yl 2,4-methylene]-5,6,7,8-tetrahydro-2,4-diphenyl-1-benzothiopyryllium chloride K$_5$ = 1,3-dimethylbenzimidazolon-2-axine.

EXAMPLE 2

8 g of copolymer (1:1) of methyl vinyl ether and maleic anhydride (Gantrez AN 149) are added to 100 ml of cyclohexanone and the whole is refluxed for two hours. By the further addition of cyclohexanone, solutions having a different content of binder are obtained. Different quantities of the dye rhodamine-6G picrate are added to these solutions. The resulting dye polymer solutions, after filtration, were provided on a plate of polymethylmethacrylate (6.25 cm×6.25 cm) and the substrate plate was then rotated on the turntable of a centrifuge. These operations are carried out in the same manner as described in the first example. The resulting dye-binder film was dried in air after which the optical density of the film in transmission was measured. The process variables and the results obtained are recorded in the following Table 2.

EXAMPLE 3

Various semi-esters of the copolymer (1:1) of methyl vinyl ether-maleic anhydride and alcohols were prepared by dissolving the copolymer in a percentage by weight of 4% in the relevant alcohols and refluxing the whole for several hours.

TABLE 2

| Wt. % of binder in cyclohexanone solution | Quantity of solution in ml. | Quantity of Dye in vol. in mg. | Speed of Centrifuge rpm | Layer thickness of dye-binder film in um. | Optical density at indicated wavelength in nm |
|---|---|---|---|---|---|
| 8 | 1 | 5 | 1000 | 1.6 | 1.64 (530) |
| 4 | 2 | 20 | 1000 | 0.67 | 1.73 (530) |
| 2 | 4 | 80 | 1000 | 0.35 | 1.70 (530) |

TABLE 2-continued

| Wt. % of binder in cyclohexanone solution | Quantity of solution in ml. | Quantity of Dye in vol. in mg. | Speed of Centrifuge rpm | Layer thickness of dye-binder film in um. | Optical density at indicated wavelength in nm |
|---|---|---|---|---|---|
| 1 | 8 | 320 | 1000 | 0.26 | 1.90 (530) |
| 0.5 | 26 | 320 | 1000 | 0.11 | 0.93 (530) |
| 0.25 | 32 | 1280 | 1000 | 0.17 | 1.57 (530) |
| 0.25 | 32 | 1280 | 1500 | 0.12 | 1.08 (530) |
| 0.25 | 32 | 1280 | 2000 | 0.10 | 0.91 (530) |

The alcohol was evaporated on a rotation evaporator in a vacuum and the resulting semi-ester was dissolved in a quantity of 0.8% by weight in a mixture (vol. ratio 17:8) of butanol and methanol. 225 mg of rhodamine-6G were dissolved in 25 ml of the resulting 0.8% binder solution. The solution was provided on the surface (6.25 cm × 6.25 cm) of a glass plate which was placed on the turntable of a centrifuge which was then rotated at a speed of 1000 rpm for 3 minutes. The binder-dye film formed on the glass plate was dried in air after which the optical density of the film at a wavelength of approximately 540 nm in transmission was measured. It is to be noted that, as in the preceding examples, no correction for reflection losses is provided. The copolymer Gantrez was tested in various molecular weight gradations as stated above. The results are recorded in Table 3 below.

TABLE 3

| Binder is semi-ester of | | Thickness of Resulting Film in um | Optical Density of Film |
|---|---|---|---|
| Gantrez Type | Alcohol | | |
| AN-149 | octyl alc. | 0.13 | 0.61 |
| AN-149 | benzyl alc. | 0.12 | 0.67 |
| AN-149 | methanol | 0.14 | 0.87 |
| AN-119 | butanol | 0.15 | 0.79 |
| AN-169 | butanol | 0.06 | 1.25 |
| AN-146 | butanol | 0.13 | 1.18 |

EXAMPLE 4

The formation of holes in the recording element of the invention by exposure to laser light of sufficient energy for recording is shown in FIG. 1 which is a photograph (enlarged 20,000 times) of a section of a surface of a dye-containing layer 1 of rhodamine-6G dissolved in a butyl semi-ester of a copolymer (1:1) of methyl vinyl ether and maleic anhydride deposited on a 1.2 mm thick substrate of polymethylmethacrylate, (not shown). The dye-containing layer 1, which is formed by the method described in Example 1 has a thickness of 0.13 um and an optical density of 1.7 at 530 mm.

By exposure to laser light originating from a laser having a power of 7.5 mW and an emission wavelength of 530 nm a hole 2 having an upright edge 3 was formed in the layer 1. The exposure time $5.10^{-7}$ sec. The hole diameter is 1.22 um. The information stored digitally in the form of holes can be read in transmission and in reflection.

Figure 2:
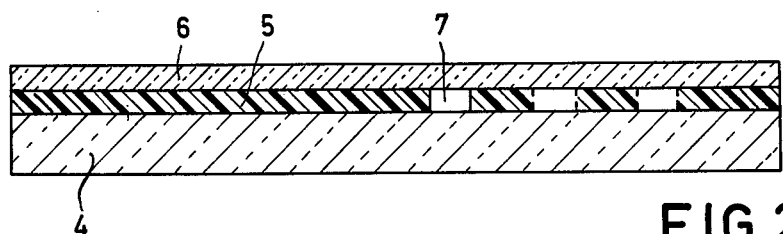
FIG. 2 is a cross-sectional view of an embodiment of a recording element according to the invention.

In the recording element shown in cross-section in FIG. 2 a glass plate 4 has a thickness of 2 mm which on one side has a dye-containing layer 5 as described in Examples 1, 2, 3. Layer 5 in turn comprises a transparent coating layer 6 of polyisobuthlmethacrylate having a thickness of approximately 3 um. Upon exposing to laser light originating from a laser having a power of 4.5 mW and a pulse time of $5.10^{-7}$ sec, decolorizing takes place in the exposed spots 7 of the dye present in the layer 5, in this case a rhodamine dye.

In the decolorized spots both the optical density and the reflection of layer 5 is reduced very considerably and the information thus recorded can be read both in reflection and in transmission with weak laser light. The recording and reading of information is preferably carried out via the glass plate 4.

Figure 3:
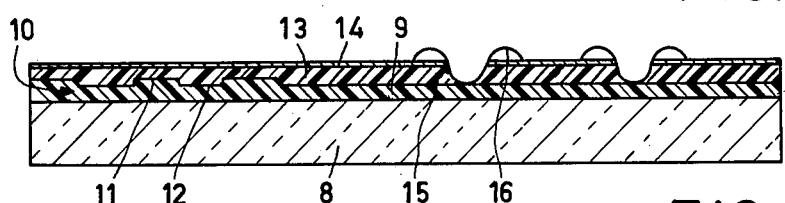
FIG. 3 is a cross-sectional view of another embodiment of the recording element according to the invention and FIG. 4 is a cross-sectional view of a double construction of the element according to the invention.

In the recording element shown in cross-section in FIG. 3 a 1.0 mm thick substrate plate of polymethylmethacrylate (8) has, on one side, a 0.5 um thick layer 9 of an ultraviolet-cured lacquer containing acrylic acid esters. Lacquer layer 9 has a servo track 10 having a crenellated profile of servo areas situated alternately at a higher level 11 and at a lower level 12. The longitudinal dimensions of the servo areas vary in agreement with the stored servo data containing information with respect to place and velocity reading. The longitudinal dimensions are roughly 0.3-3 um, while the difference in level between the areas is approximately 0.1-0.3 um. Layer 9 is covered with a dye-containing layer 13 as described in examples 1 to 3, which in turn is covered by a 30 nm thick ablative recording layer 14 of $Te_{33}Sb_{33}Se_{34}$.

When the element shown in FIG. 3 is used, the servo track 10 is read with weak laser light in reflection via substrate plate 8 and on the basis of phase differences.

On the basis of the servo data, information is recorded with pulsated laser light originating from a laser having a power of 9 mW and a pulse time of $10^{-7}$ sec. The pulsated laser light is focused on the layer 13 via the substrate plate 8. As a result of the exposure to laser light, holes 15 are formed in the layers 13 and 14 having a ridge portion 16 which consists of material originating from both the layer 13 and the layer 14. The diameter of the formed holes is 1.2 um. The recorded information may be read either in reflection or transmission from the air or via the substrate plate 8.

Figure 4:
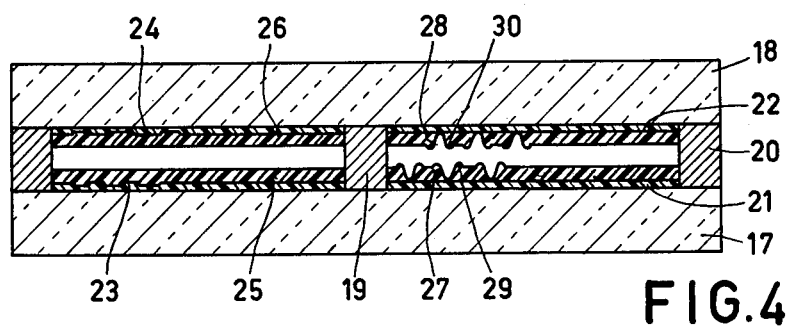

In the recording element shown in cross-section in FIG. 4 two parallel arranged glass plates 17 and 18 each have a thickness of 1 mm. These glass substrate plates are connected together by a cylindrical central spacer 19 manufactured from metal, as well as an annular metal second spacer 20. The spacers 19 and 20 adhere to plates 17, 18 and seal the space between the plates in an airtight manner from the surroundings. The opposing surfaces of plates 17 and 18 are provided between the spacers 19 and 20 with U.V. light-cured acrylate lacquer layers 21 and 22, respectively. Optically readable servo tracks 23 and 24, respectively, are provided in the surface of the lacquer layers 21 and 22. Lacquer layers 21 and 22 have a thickness of roughly 1 um and are covered with dye-containing recording layers 25 and 26, respectively, as described in examples 1-3. Upon recording information the servo track is read with weak laser light in reflection via the substrate plate and, on the basis of the servo data, holes 27 and 28, respectively, are formed in the recording layer by means of pulsated laser light which is focused on the recording layers 25 and 26, respectively. The laser has a power of 7 mW on the recorded layer and a pulse time of $5.10^{-7}$ sec. The holes 27 and 28, corresponding to the information have a diameter of 1.0 um and are provided with ridge portions 29 and 30, respectively. The recorded information is read in reflection with weak laser light via the substrate plates 17 and 18, respectively.

We claim:

1. An information recording element for optically recording optically readable information comprising a disc-shaped substrate on one surface of which there is present an optically readable servo track which has at least partially a relief structure of servo areas situated alternatively at a higher and a lower level and on which servo track there is present, as a recording layer, a mixture of a dye and a copolymer (1:1) of methyl vinyl ether and maleic anhydride or a semi-ester of said copolymer and an aliphatic alchohol which may be substituted with an aromatic radical and contains 1-8 carbon atoms.

2. The information recording element of claim 1, wherein up to 95% by weight of an ionic dye is present in the mixture.

3. The information recording element of claim 1 wherein a transparent coating layer inert to laser light is present on the surface of the recording layer remote from the substrate.

4. The information recording element of claim 1 wherein a reflective ablative recording layer is present on the surface of the recording layer remote from the substrate.

5. The information recording element of claim 1, wherein the dye is mixed with a semiester of a copolymer of methyl vinyl ether and maleic anhydride and an aliphatic alcohol which may be substituted with an aromatic radical and contains 1-18 carbon atoms.

6. The information recording element of claim 5, wherein the alcohol is butanol.

* * * * *